July 12, 1949.  C. C. FUERST  2,475,952
AUTOMATIC TWO-BLADE SHUTTER FOR CAMERAS
Filed Nov. 26, 1946
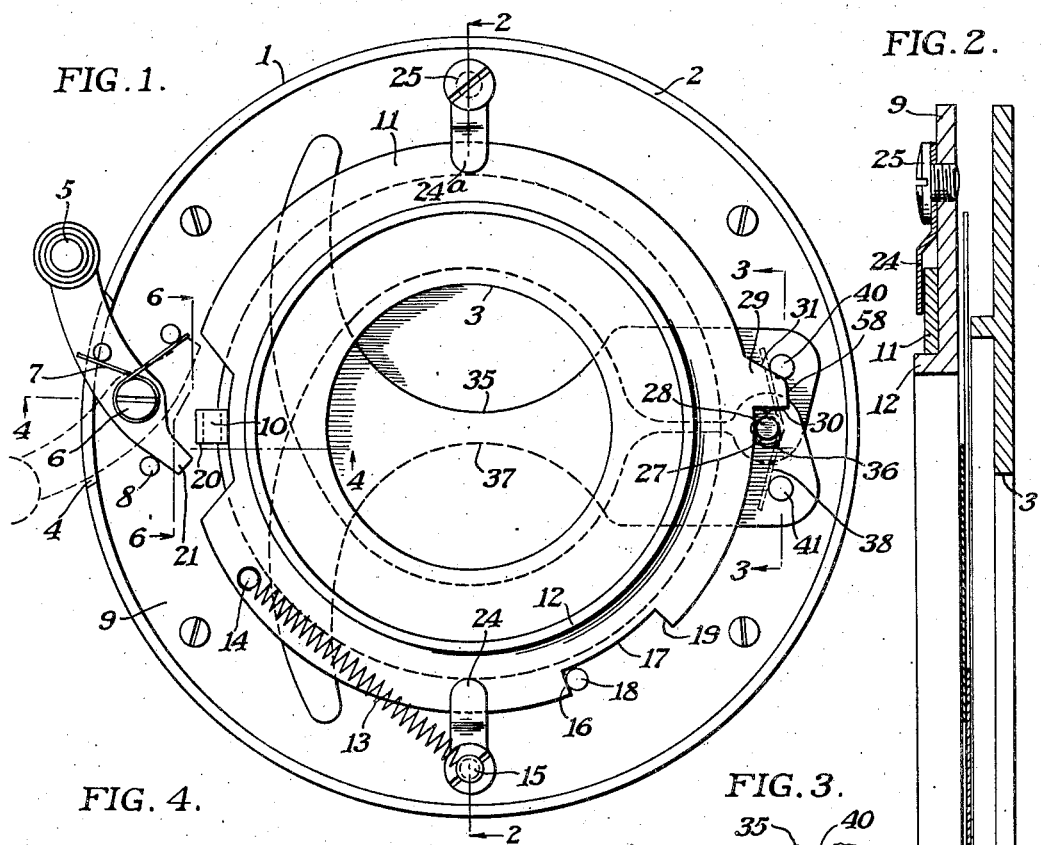
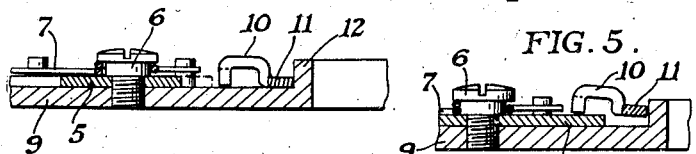
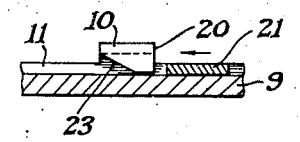
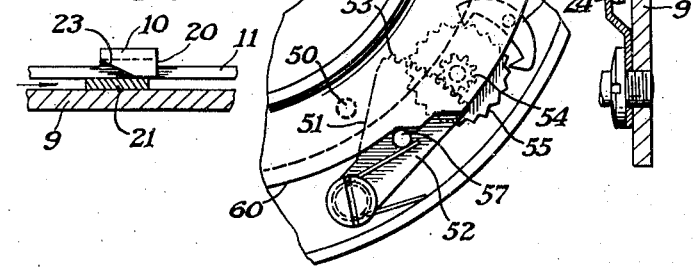
CARL C. FUERST
INVENTOR
BY
ATTORNEYS Patented July 12, 1949

2,475,952

UNITED STATES PATENT OFFICE 2,475,952

AUTOMATIC TWO-BLADE SHUTTER FOR CAMERAS

Carl C. Fuerst, Rochester, N. Y., assignor to Eastman Kodak Company, Rochester, N. Y., a corporation of New Jersey Application November 26, 1946, Serial No. 712,349

3 Claims. (Cl. 95—62)

This invention relates to photography and particularly to a simple type of camera shutter. One object of my invention is to provide an inexpensive camera shutter consisting of comparatively-few, relatively-simple parts. Another object of my invention is to provide a shutter which can be readily assembled by relatively-unskilled help. A still further object is to provide a shutter which is reliable and which will produce a short range of exposures and maintain these exposures. A still further object of my invention is to provide a shutter in which the parts do not have to be made with extreme accuracy to produce the desired results. Other objects will appear from the following specification, the novel features being particularly pointed out in the claims at the end thereof.

Coming now to the drawings wherein like reference characters denote like parts throughout:

Fig. 1 is a front plan view of a shutter with the shutter cover removed constructed in accordance with and embodying a preferred form of my invention;

Fig. 2 is a fragmentary sectional view taken on line 2—2 of Fig. 1, certain parts being incompletely shown;

Fig. 3 is an enlarged fragmentary detail partially in section taken on line 3—3 of Fig. 1;

Fig. 4 is an enlarged fragmentary part section taken on line 4—4 of Fig. 1;

Fig. 5 is a view similar to Fig. 4 but with the parts in a different position;

Fig. 6 is a fragmentary detail enlarged view partially in section and taken on line 6—6 of Fig. 1;

Fig. 7 is a view similar to Fig. 6 but with the parts in a different position;

Fig. 8 is an enlarged fragmentary sectional view through one of the resilient master member holding clips; and Fig. 9 is a fragmentary detail illustrating a retarding mechanism which can be used with the shutter shown in Fig. 1 if slow, instantaneous exposures are desired.

My present invention may be considered to be an improvement over the shutter shown in Patent No. 764,421, Bullard, July 5, 1904. This patent employs two blades and a ring type of master member, but in my improved form of shutter many simplifications have been made, although the shutter does include the same type of two-blade construction.

As indicated in Fig. 1, my shutter may consist of a casing 1 having an upstanding flange 2 around the periphery and an exposure opening 3 in the center of the casing. The flange 2 is slotted at 4 so that a shutter trigger 5 may project through the flange and may move from the full line rest position in Fig. 1 to the broken line position of the same figure. The trigger 5 is pivoted on a stud 6 and a spring 7 normally holds the trigger in its rest position, as shown. A stop pin 8 on the mechanism plate 9 may limit the movement of the trigger in one direction.

The trigger is adapted to cooperate with a bent finger 10 which may be formed from the metal of the ring-shaped master member 11, this master member turning about an upwardly-extending flange 12 on the mechanism plate 9. A spring 13, attached to a pin 14, carried by the master member and to a stud 15 carried by the mechanism plate 9, normally holds the master member in its rest position, shown in Fig. 1, with one edge 16 of a cut-out portion 17 at rest against a stop pin 18. The master member may oscillate through a range not greater than the distance between the shoulders 16 and 19.

The downwardly-formed finger 10, as best shown in Figs. 4 and 6, presents a straight edge 20 to the end 21 of the trigger 5 in one direction—that is in the direction engaged by the trigger end 21 when it is being moved from its rest position to the dotted position in Fig. 1. Thus, during this movement the finger is engaged and the master member is moved to tension the spring 13 up to the time that the end 21 of the trigger slips off the finger. The spring is then free to turn the master member in a reverse direction to open and close the shutter blades, as will be hereinafter more fully described.

As shown in Fig. 7, the finger 10 is also provided with a beveled or tapered surface 23 which may be engaged by the end 21 of the trigger when it moves under the influence of spring 7 to its rest position. Because of this beveled surface, it lifts the finger 10 and with it the master member 11, so that it may pass freely under this spring finger. This movement is permitted because of a pair of oppositely-disposed spring clips 24 and 24a, clip 24 being attached to the mechanism plate 9 by means of the stud 15 and clip 24a being attached to the mechanism plate by a similar stud 25. Both these fingers are resilient and, while they tend to hold the master member 11 flat in a plane upon the mechanism plate 9, nevertheless they permit the master member 11 to move from this plane in a more or less axial direction, so that the master member may rock from its plane when the trigger passes under the bent-over finger 10. It may also do the same thing when the blade pin 27, which also has a beveled surface 28, passes under a blade-operating cam 29 preferably integrally formed on the master member 11.

The blade-operating cam 29 presents one flat surface 30 to the beveled side 28 of the blade-operating pin 27 so that in moving towards its spring tension position the blade ring 11 may rock more or less axially from its normal plane of movement so as to snap over the pin 27. When ring 11 moves in an exposure-making direction there is a cam surface 31 which strikes the straight side 32 of the blade-operating pin 27 so that the blade ring swings pin 27 outwardly and past cam 58 until the cam 58 passes pin 27 allowing the shutter blades to close.

The blade ring pin 27 is carried by one of the two shutter blades 35 and passes through an elongated opening, or slot 36, in the other shutter blade 37. A spring 38 coiled about a shoulder 39 on the pin normally holds the pin in the position shown in Fig. 1 in which the shutter blades are held closed. Blade 35 is pivoted upon a pin 40 and blade 37 is pivoted upon a pin 41, the pins 40 and 41 retaining the ends 42 and 43 of the spring 38 in an operative position.

The shutter blades 35 and 37 are very much alike, being substantially the same shape except that one is a right-hand and the other is a left-hand blade. In the normal position of rest, they overlap and cover the exposure opening 3. However, when the pin 27 is struck by the rapidly-moving master member 11, the cam surface 31 moves the pin 27 towards the flange 2 simultaneously opening both blades, and after the cam 29 has passed, permitting the blades to close rapidly when the pin 27 snaps down past the shoulder 30.

If a single speed shutter is required with an exposure which is relatively fast—say 1/100 of a second—the mechanism may not require a retard. However, it is a comparatively simple matter to obtain a shutter with 1/25 and 1/50 of a second, as well as bulb exposures, so that where this is required, the gear retard, shown in Fig. 9, may be employed. If the gear retard is used, the master member 11 may be provided with a retard pin 50 adapted to lie in the path of an edge 51 of a gear sector 52, the gear teeth of which, 53, mesh with the pinion 54 having ratchet teeth 55. A pallet 56 may engage this ratchet. A pin 57 may be moved by a suitable cam to engage the cam surface 51 more or less with the pin 50 to determine the length or duration of the short, instantaneous exposures. The pin 50 is positioned on the master member 11 so as to strike the cam surface 51 while the blade pin 27 is riding on the flat surface 58 on the end of the cam 29. Consequently, the retarding action takes place while the blades are fully opened and the pin 50 rides past the end of the sector 52 when the blade ring pin 27 reaches the shoulder 30.

The shutter above described consists of extremely few parts, practically all of which can be stamped from sheet metal with a minimum number of forming operations. The construction is such that the parts go together readily and can be assembled with relatively-unskilled help and there are very few extremely close tolerances which require hand work or fitting in assembling the shutter.

The operation of the shutter is extremely simple. By depressing the trigger 5, the trigger end 21 engages the finger 10 on the straight side 20 moving the master member 11 until the spring 13 is tensioned. During this movement the blade-operating cam 29, through its straight edge 30, engages the blade ring pin 27 and since the spring clips 24 and 24a will freely flex, the blade ring 11 moves from its normal plane of movement a short distance axially in riding up and over the pin 27, the blade ring 11 returning to its normal plane of movement just before the end 21 of the trigger rides off the bent finger 10. When the trigger releases the master member, the spring 13 rapidly turns the master member in a counter-clockwise direction so that the cam 29, through its inclined edge 31, engages the straight side 32 of the pin 27 and rapidly opens the shutter blades 35 and 37. The blades are held open while the pin rides over the surface 58 of the cam 29 and the spring 38 rapidly closes the blades when the pin 27 snaps back to its Fig. 1 position.

This movement occurs quite rapidly and I have found that an actual 1/100 of a second can readily be obtained without too great a force being applied to the trigger 5. Higher speeds are possible but they usually impose an undesirable trigger load which is sometimes apt to shake the shutter in making an exposure. If the gear retard shown in Fig. 9 is employed, a slower exposure can be obtained by moving an adjusting cam 58 to throw the gear segment 52 into the path of the pin 50, thus slowing up the movement of the master member during the time the pin 27 is riding on the surface 58 of the cam 29.

I claim:

1. A shutter for photographic cameras comprising, in combination a shutter casing having an exposure opening therein, a pair of shutter blades oscillatably mounted on pivots therein, an operating pin on one blade extending through a slot in the other blade for moving transversely of the pivots to oscillate the blades by moving radially of the shutter, a beveled surface on the pin, a master member extending around the exposure opening to oscillate on the shutter casing, a blade pin operating cam thereon having a path of movement intercepting the operating pin, a pivotally-mounted trigger spring-held in a rest position on the shutter at substantially 180° from the operating pin and movable through a path, a pair of spring clips holding the master member resiliently against the casing, said spring clips being oppositely disposed and substantially midway between the trigger and the blade-operating pin whereby said master member may move axially as well as oscillate about the axis of the casing, a beveled finger on one side of the master member lying in the path of movement of the trigger, the beveled surface on the operating pin moving the master member axially during the first part of the trigger movement to set and release the master member and the beveled surface on the master member moving the master member axially when the trigger returns to its normal position of rest.

2. A shutter for photographic cameras as defined in claim 1 characterized by a retard pin carried by the master member, a retarding gear train including a gear segment having a cam surface thereon carried by the casing and means for moving the cam surface to and from the path of the retard pin carried by the master member for controlling the speed of an exposure, said retard pin being of a height to engage the gear segment in all positions of the master member.

3. A shutter for photographic cameras comprising, in combination a shutter casing having an exposure opening therein, a pair of shutter blades oscillatably mounted on pivots therein, an operating pin on one blade extending through a slot in the other blade for moving transversely of the pivots to oscillate the blades and having a path of movement, a beveled surface on the pin, a master member extending around the exposure opening, a mount for the master member on which the master member may lie in a plane, said mount including a pair of oppositely-disposed spring clips under which the master member may oscillate in a plane and rock from said plane, a blade pin operating cam carried by the master member in position to coact with the blade ring pin, a trigger lug carried by the master member opposite to the blade pin operating cam, said spring clips lying substantially midway therebetween, the beveled surface of the operating pin rocking the master member from its normal plane when passing beenath the blade ring operating cam during movement of the master member by the trigger, a trigger spring-held in a rest position and having an operating finger beveled on one side positioned to coact with the trigger lug carried by the master member and for moving the master member by the trigger lug, said operating finger beveled on one side rocking the master member in an opposite direction on the shutter casing when said trigger is moved by its spring to a normal rest position, said spring clips flexing at each movement of the master member from its plane.

CARL C. FUERST.

REFERENCES CITED

The following references are of record in the file of this patent:

UNITED STATES PATENTS

| Number | Name | Date |
|---|---|---|
| 764,421 | Bullard | July 5, 1904 |
| 2,326,077 | Steiner | Aug. 3, 1943 |